United States Patent [19]

Joo et al.

[11] 4,377,463

[45] Mar. 22, 1983

[54] CONTROLLED ATMOSPHERE PROCESSING OF TIB$_2$/CARBON COMPOSITES

[75] Inventors: Louis A. Joo, Johnson City; Kenneth W. Tucker, Elizabethton; Scott D. Webb, Watauga, all of Tenn.

[73] Assignee: Great Lakes Carbon Corporation, New York, N.Y.

[21] Appl. No.: 287,127

[22] Filed: Jul. 27, 1981

[51] Int. Cl.$^3$ ............... C25C 3/06; C25C 7/02; C01B 35/04
[52] U.S. Cl. ............... 204/294; 204/291; 423/297; 501/96
[58] Field of Search ............... 204/291, 294; 501/96; 423/297

[56] References Cited

U.S. PATENT DOCUMENTS

| | | | |
|---|---|---|---|
| T993,002 | 5/1979 | Kaplan | 204/243 R |
| 2,915,442 | 12/1959 | Lewis | 204/67 |
| 3,028,324 | 4/1962 | Ransley | 204/67 |
| 3,151,053 | 9/1964 | Lewis | 204/244 |
| 3,156,639 | 11/1964 | Kibby | 204/243 |
| 3,314,876 | 4/1967 | Ransley | 204/291 |
| 3,316,062 | 4/1967 | Criscione et al. | 423/297 |
| 3,400,061 | 9/1968 | Lewis | 204/67 |
| 3,726,643 | 4/1973 | Merzhanov et al. | 423/297 X |
| 4,071,420 | 1/1978 | Foster | 204/67 |
| 4,259,119 | 3/1981 | Watanabe et al. | 501/96 X |
| 4,275,026 | 6/1981 | Hazel et al. | 501/96 X |

FOREIGN PATENT DOCUMENTS

| | | | |
|---|---|---|---|
| 882992 | 10/1980 | Belgium . | |
| 922384 | 3/1973 | Canada | 327/114 |
| 2757808 | 6/1978 | Fed. Rep. of Germany | 204/294 |
| 1010492 | 11/1965 | United Kingdom | 423/297 |

OTHER PUBLICATIONS

Sands and Shakespeare, *Powder Metallurgy*, George Newnes Ltd., London, 1966, p. 39.

Billehaug, K. et al., "Inert Cathodes for Aluminium Electrolysis in Hall–Heroult Cells", *Aluminium*, vol. 56, (1980), pp. 642–648 and 713–718.

*Primary Examiner*—F. Edmundson
*Attorney, Agent, or Firm*—Adrian J. Good

[57] ABSTRACT

TiB$_2$-carbon composites are produced by mixing the raw materials comprised of carbon, TiB$_2$, pitch, and other reactants, forming a shaped article, processing in a nitrogen atmosphere up to 2100° C., and in a noble gas above 2100° C.

8 Claims, No Drawings

CONTROLLED ATMOSPHERE PROCESSING OF TIB₂/CARBON COMPOSITES

DESCRIPTION

BACKGROUND OF THE INVENTION

Refractory hard metals (RHM) as a class are hard, dense materials with high melting points, and are generally of low solubility and resistant to corrosive attack by most acids and alkalis.

RHMs have high electrical conductivity due to their metallic structure; consequently, this combination of properties has made them candidates for use as electrodes in molten salt electrolysis processes where their corrosion resistance and conductivity are vital properties needed for economical performance.

The RHMs have other properties which have limited their usage up to the present time. They are usually brittle, have little resistance to thermal shock, and are quite expensive to produce and fabricate into useful articles.

RHM articles have been produced by a number of processes including hot pressing of the granular or powdered materials, chemical vapor deposition, and in situ reduction of metals by carbon or other reducing agents. Hot pressing is the most commonly used process for production of shapes. A die and cavity mold set is filled with powder, heated to about 300°–800° C. and placed under pressure of about $2 \times 10^8$ Pa, then removed from the mold and heated at about 1500°–2000° C., or higher, or sintered in the mold.

Hot pressing has the limitations of applicability to simple shapes 25 only, erosion of the mold, and slow production. The pieces produced by hot pressing are subject to a high percentage of breakage in handling, making this process expensive in terms of yield of useful products.

The RHMs of most interest include the carbides, borides, and nitrides of the metals of IVA, IVB, VB, and VIB of the periodic table, particularly Ti, V, Si, and W. Of these, the borides are of most interest as electrodes in high temperature electrolysis applications due to their electrical conductivity, and of the borides, TiB₂ has been extensively investigated for use as a cathode or cathodic element in the Hall-Heroult cell.

Typically the Hall cell is a shallow vessel, with the floor forming the cathode, the side walls a rammed coke-pitch mixture, and the anode a block suspended in the molten cryolite bath at an anode-cathode separation of a few centimeters. The anode is typically formed from a pitch-calcined petroleum coke blend, prebaked to form a monolithic block of amorphous carbon. The cathode is typically formed from a pre-baked pitch-calcined anthracite or coke blend, with cast-in-place iron over steel bar electrical conductors in grooves in the bottom side of the cathode.

During operation of the Hall cell, only about 25% of the electricity consumed is used for the actual reduction of alumina to aluminum, with approximately 40% of the current consumed by the voltage drop caused by the resistance of the bath. The anode-cathode spacing is usually about 4–5 cm., and attempts to lower this distance result in an electrical discharge from the cathode to the anode through aluminum droplets.

The molten aluminum is present as a pad in the cell, but is not a quiescent pool due to the factors of preferential wetting of the carbon cathode surface by the cryolite melt in relation to the molten aluminum, causing the aluminum to form droplets, and the erratic movements of the molten aluminum from the strong electromagnetic forces generated by the high current density.

The wetting of a solid surface in contact with two immiscible liquids is a function of the surface free energy of the three surfaces, in which the carbon cathode is a low energy surface and consequently is not readily wet by the liquid aluminum. The angle of a droplet of aluminum at the cryolite-aluminum-carbon junction is governed by the relationship $$\cos \theta = \frac{\alpha_{12} - \alpha_{13}}{\alpha_{23}}$$

where $\alpha_{12}$, $\alpha_{13}$, and $\alpha_{23}$ are the surface free energies at the aluminum carbon, cryolite-carbon, and cryolite-aluminum boundaries, respectively.

If the cathode were a high energy surface, such as would occur if it were a ceramic instead of carbon, it would have a higher contact angle and better wettability with the liquid aluminum. This in turn would tend to smooth out the surface of the liquid aluminum pool and lessen the possibility of interelectrode discharge allowing the anode-cathode distance to be lowered and the thermodynamic efficiency of the cell improved, by decreasing the voltage drop through the bath.

Typically, amorphous carbon is a low energy surface, but also is quite durable, lasting for several years duration as a cathode, and relatively inexpensive. However, a cathode or a cathode component such as TiB₂ stud which has better wettability and would permit closer anode-cathode spacing could improve the thermodynamic efficiency and be very cost-effective.

Several workers in the field have developed refractory high free energy material cathodes. Can. 792,818, Mandorf et al. discloses metal boride compacts sintered in an argon atmosphere at 2000° C. prior to impregnation with molten aluminum. Sands and Shakespeare, *Powder Metallurgy*, George Newnes Ltd., London, 1966, disclose sintering metal powders in inert atmospheres. Schwarzkopf and Kieffer, *Refractory Hard Metals*, Macmillan & Co., New York, 1953, disclose the production of TiB₂ from the elements in a reduced atmosphere of argon. U.S. Pat. No. 3,028,324, Ransley, Apr. 3, 1962, claims a method of producing aluminum, using a mixture of TiC and TiB₂ prepared in hydrogen or a vacuum, as the cathode. U.S. Pat. No. 3,314,876, Ransley, Apr. 18, 1967, discloses the production of TiB₂ for use in Hall cell electrodes, by hot pressing in a hydrogen atmosphere.

None of the above disclose the use of the combination of gases disclosed herein.

SUMMARY OF THE INVENTION

Titanium Diboride, TiB₂ has been proposed for use as a cathodic element in Hall cells, giving an improved performance over the amorphous carbon and semi-graphite cathodes presently used.

It had previously been known that Titanium Diboride (TiB₂) was useful as a cathode component in the electrolytic production of aluminum, when retrofitted in the Hall cell in conjunction with the carbon or semi-graphite form. The electrical efficiency of the cell was improved due to better conductivity, due mainly to a closer anode-cathode spacing; and the corrosion resistance was improved, probably due to increased hardness, and lower solubility and chemical inertness as compared to the carbon and graphite forms. If the anode-cathode (A-C) distance could be lowered, the potential savings in electricity would be as follows:

| A-C distance | % savings |
|---|---|
| 3.8 cm. | std. |
| 1.9 cm. | 20% |
| 1.3 cm. | 27% |
| 1.0 cm. | 30% |

The principal deterrent to the use of $TiB_2$ as a Hall cell cathode has been the sensitivity to thermal shock and the great cost, approximately $25/lb. based on raw material costs alone as compared to the traditional carbonaceous compositions, which cost about $0.60/lb.

We have developed a new process for the production of $TiB_2$, and other refractory hard metal-carbon composite articles which gives improved processing and is markedly more economical than processes presently in use.

During the processing of RHM-carbon articles we have found that we obtain better performance in the Hall cell if the carbon component of the composite is converted to a graphitic or semi-graphitic form, which necessitates heating the article to a temperature of about 2100° C. We have found that carbon-$TiB_2$ composites heat treated to that temperature have superior resistance to the heat involved in cell operation, and also to corrosive attack by the electrolyte, as compared to the amorphous carbon-$TiB_2$ composites. The $TiB_2$-carbon composites involved may be manufactured by several different methods which include mixing particulate $TiB_2$ and optionally particulate carbon with a carbonizable liquid binder, extruding or molding a shape, and baking to carbonize the binder, by in situ reactions forming $TiB_2$ in a carbon composite, as in co-pending commonly assigned applications Ser. Nos. 186,181, 186,180, and 287,129, by isostatic hot pressing, by sintering as in commonly assigned application Ser. No. 287,125, by vapor deposition and other methods.

In all of the above processes for manufacture of carbon-RHM composites, we have found superior performance in the Hall cell if the composite is heated as above to about 2100° C. or higher to graphitize the carbon.

During processing of carbon-RHM composites the carbon will oxidize to CO or $CO_2$ if the article is processed in an air atmosphere. Consequently a nitrogen atmosphere has commonly been used to avoid this difficulty. However, nitrogen, while relatively unreactive at ambient temperatures, at elevated temperatures of 2000° C. and over, can be highly reactive with many elements and compounds, and is unsatisfactory for use with many RHMs.

We have found that when processing carbon-$TiB_2$ mixtures in a nitrogen atmosphere, that the observed melting point and percentage of $TiB_2$ are inversely related, i.e., that higher concentrations of $TiB_2$ lower the melting point, of the mixture, and that when processing $TiB_2$ in nitrogen some BN and TiB are detected by x-ray diffraction in the final material if the temperature is higher that about 2200° C. In pure argon the melting point of the $TiB_2$-composite is much higher, about 2450° C. (All physical quantities given herein use the metric or S1 designations unless otherwise stated.)

We have found that we obtain better yields of products and can operate more economically by the use of a system of interchangeable or multiple processing atmospheres. At temperatures below about 2100° C. we operate in a nitrogen atmosphere, which is inert with the components of the mix below that temperature, and at temperatures above 2100° C., we use a noble gas atmosphere, preferably argon. By using this combination, we maintain an inert atmosphere around the articles being produced at the lowest possible cost, with a high weight percentage yield, based on the raw material weights.

DESCRIPTION OF THE PREFERRED EMBODIMENT

During the processing of an article consisting primarily of one or more refractory hard metals in combination with a source of elemental carbon, whether it be from a carbonizable binder such as a pitch or a particulate source such as petroleum coke, it has been found advantageous in some applications, particularly for use as cathodic elements in Hall cells, for the carbon to be in the graphitic or semi-graphitic form. To convert carbon to a graphitic or semi-graphitic form, it is necessary that it be heated to a temperature of at least 2000° and generally in the neighborhood of 2100° or more, and occasionally up to ca. 3000° C. We have found that at a temperature of 2300° or higher, nitrogen may react with many of the RHMs and other materials, forming undesirable reaction products, lowering the melting point of the solid, and in general having a deleterious influence on the course of the reaction as well as the ultimate Hall cell performance of the article. We have also found that we can use argon, or other noble gases in Group VIII of the periodic table, as the process atmosphere, maintaining a completely inert atmosphere around the articles being processed. We have also found that we may use a non-oxidizing atmosphere of nitrogen when processing articles to be heat treated up to a temperature of about 2100°-2300°. If we wish to heat treat the article at a higher temperature, we may use nitrogen up to 2000°-2100° C., then change the atmosphere to argon when the temperature reaches that point. By use of this process, we are able to use the most economical gas for the major portion of the process, reserving the more expensive and inert gas for the really critical portion of the process. We may also switch back to the nitrogen atmosphere on cooling to about 2000° C. or thereabouts for economy in the process.

When cooling the processed article, we find it necessary to maintain a non-oxidizing or non-reactive atmosphere down to a temperature of 400° C. or below, and preferably 200° C. and below, to prevent reaction with air from occurring.

The method is generally adaptable to any of the various processes for the production of RHM containing articles at temperatures over approximately 2000° C. These processes include sintering of either loose filled or pressed articles; the heat treatment of mixtures of a RHM and carbonaceous materials, e.g., $TiB_2$ plasticized with coal tar pitch; heat treatment of reactants to form the RHM in situ, e.g., $B_4C+C+TiO_2$; RHM deposited by chemical vapor deposition, e.g.,

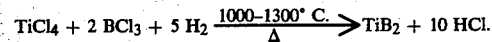

EXAMPLE 1

A graphite mold was filled with TiB$_2$ powder having a maximum particle size of 44µ, and a mean particle size of 7µ. It was heated to 2615±15° C. in an argon atmosphere and held there for two hours. The TiB$_2$ was partially melted, and had attacked the wall of the graphite mold.

EXAMPLE 2

A series of pieces was made by sintering the TiB$_2$ powder used in Example 1, using a graphite mold in argon at temperatures ranging from 1700°–2400° C., with results as follows:

| Sintering Temp. | A.D. (Apparent Density) | % Porosity |
|---|---|---|
| 1700° C. | 2.92 g/cc | 35 |
| 1900° C. | 3.04 g/cc | 33 |
| 2200° C. | 3.98 g/cc | 12 |
| 2300° C. | 3.98 g/cc | 12 |
| 2400° C. | 3.92 g/cc | 13 |

The molds were placed in the furnace, the atmosphere purged with argon, and the furnace heated to the final temperature, held there for 1-2 hours, and the power disconnected. The argon atmosphere was also maintained during cool-down. All of the pieces produced were strong and homogeneous in appearance.

EXAMPLE 3

A mixture of 85% by wt. of the TiB$_2$ powder used in Example 1 with 15% by wt. of ground calcined coke with a similar particle size maximum of 44µ was poured into a graphite mold, heated to 1900° C. in argon, and cooled. The article was strong and abrasion resistant.

EXAMPLE 4

The same TiB$_2$ powder used in Example 1 was dispersed in molten coal tar pitch at about 175° C., using 85% TiB$_2$–15% pitch by wt. The plastic mixture was molded into a cylinder, baked on a six day cycle rising to 720° C., removed from the baking oven, and heat treated at 2100° C. in nitrogen. The article thus produced was tested as a cathodic component in a Hall cell with excellent results, being wetted by the molten aluminum and showing little visible corrosions or other defect.

EXAMPLE 5

The same materials and procedures were used as in Example 4 above, except that the atmosphere in the furnace was argon and the final temperature was 2400° C. The piece produced had good performance when tested in the Hall cell.

EXAMPLE 6

A piece was produced from the following raw material composition:

| | |
|---|---|
| TiB$_2$ | 72.0% by wt. |
| Sponge Coke Flour | 12.7% by wt. |
| 110° Coal Tar Pitch | 15.3% by wt. |
| | 100.0% |

The mixture was heated to 175° C. and the solids dispersed in the molten pitch. The mixture was cooled, then molded to a cylindrical shape. It was baked on a six day cycle rising to 720° C., then cooled, placed in a furnace with a nitrogen atmosphere, and heated to 2100° C. The piece produced showed good durability with little corrosion and no cracking when tested as a cathodic element in a Hall aluminum cell.

EXAMPLE 7

A mixture of the following composition was used to produce a cathodic element for a Hall cell.

| | |
|---|---|
| TiB$_2$ Powder | 72.0% by wt. |
| Sponge Coke | 12.7% by wt. |
| 110° Coal Tar Pitch | 15.3% by wt. |
| | 100.0% |

The mixture was processed as in Example 4 except in argon. The cathodic element produced was tested in a Hall cell with satisfactory performance.

EXAMPLE 8

The same raw materials and procedures used in Example 4 are used to make a cathodic element, with a nitrogen atmosphere used up to 2100° C. The article is then further heated to 2400° C. in an argon atmosphere by purging the nitrogen with argon and maintaining the argon atmosphere up to the final temperature and during cooling of the element.

EXAMPLE 9

The same materials and procedures used in Example 6 are used to make a cathodic element for a Hall cell. When the element reaches 2100° C., the atmosphere is purged with argon and further heated to 2400° C. with argon. On reaching 2400° C., the power is cut off and the furnace allowed to cool. When the temperature has cooled to about 2000° C., the small argon flow required to maintain the atmosphere is replaced by nitrogen and the nitrogen atmosphere maintained to ambient or slightly above.

EXAMPLE 10

A cathodic element for a Hall cell was produced from a mixture of 50% TiB$_2$ (85% assay), 27% prilled pitch (coal tar pitch, 110° softening point), and 23% calcined sponge coke (particle size 3 mm mean diam.). The mixture was heated and the particulate matter dispersed in a sigma mixer at 170° C., then molded at 1.4×10$^7$ Pa (2000 PSI). The element was baked to about 720° over a six day period to carbonize the pitch, impregnated with petroleum pitch, re-baked, and heated in argon to 2400° C. to graphitize the carbon. The element formed had an A.D. (Apparent Density) of 2.26. After a test run in a Hall cell, the element was fully wetted by the aluminum and edges were sharp, indicating good resistance of the element to corrosion by the electrolyte.

EXAMPLE 11

Small solidified puddles of a material presumed to be a TiB$_2$ alloy were noted on samples heat treated to 2300° C. and higher in a nitrogen atmosphere.

Four samples of different compositions were processed at 2700° and 2400° C. with results as follows:

| Sample No. | Temp., °C. | Atm. | Carbon-TiB$_2$ | Results |
|---|---|---|---|---|
| 1 | 2700° | N$_2$ | 70-30 | Sample stuck to graphite |

-continued

| Sample No. | Temp., °C. | Atm. | Carbon-TiB$_2$ | Results |
|---|---|---|---|---|
| 2 | 2700° | N$_2$ | 50—50 | Metallic liquid drops on sample side container |
| 3 | 2400° | N$_2$ | 50—50 | Large metallic puddle beside sample |
| 4 | 2400 | N$_2$ | 0—100 | Pressed powder preform-melted |

The puddles found in the above samples were analyzed by x-ray diffraction and found to contain TiB$_2$, TiO, BN, and C.

Based on the above, a series of tests was run in argon and nitrogen atmospheres. A sample containing 50% TiB$_2$-50% sponge coke flour was mixed with pitch, baked, impregnated with pitch and re-baked, both bakes rising to about 800° over a six day period. The sample above was then divided and the pieces processed in nitrogen and argon atmospheres:

| Sample No. | Temp., °C. | Atm. | Results |
|---|---|---|---|
| 5 | 2350° | N$_2$ | Metallic liquid solidified on surface |
| 6 | 2200° | N$_2$ | Good-black powder on surface |
| 7 | 2000° | N$_2$ | Good-black powder on surface |
| 8 | 2400° | Ar | Good-light gray powder on surface |
| 9 | 2200° | Ar | Good-light gray powder on surface |
| 10 | 2000° | Ar | Good-light gray powder on surface |
| 11 | 2340° | Ar | Good-light gray powder on surface |

The results indicated that a nitrogen atmosphere was unsuitable for processing TiB$_2$ at temperatures of about 2300° C. or higher, and that an argon atmosphere is preferable at this temperature range.

We claim:

1. In a process for the production of an article comprising a refractory hard metal, the improvement comprising processing said article in an atmosphere of nitrogen at temperatures rising to 2100° C., and processing said article in an atmosphere of noble gas at temperatures rising to above 2100° C.

2. In a process for the production of an article comprising a refractory hard metal, the improvement comprising the use of a nitrogen atmosphere at temperatures up to about 2100° C., purging said atmosphere with a noble gas, and maintaining a noble gas atmosphere up to a final temperature above 2100° C.

3. The process of claim 2 wherein the noble gas atmosphere is maintained while cooling the article to a temperature below 400° C.

4. The process of claim 2 wherein the noble gas atmosphere is maintained while cooling the article to approximately 2100° C., and a nitrogen atmosphere maintained to a temperature below 400° C.

5. The process of claims 1 or 2 wherein the noble gas is argon.

6. The process of claims 1 or 2 wherein the refractory hard metal is TiB$_2$.

7. In a process for the production of a cathodic component for a Hall cell comprising TiB$_2$ wherein said component is heated to a temperature of 2000° C. or higher, the improvement comprising the use of a nitrogen atmosphere when heating said component up to about 2100° C., and the use of an argon atmosphere when heating said component at temperatures rising to above 2100° C.

8. The process of claims 1, 2, or 7 wherein the refractory hard metal comprises from 50 to 100% TiB$_2$ with from 0 to 50% carbon.

* * * * *